(12) United States Patent
Keown et al.

(10) Patent No.: US 11,639,273 B2
(45) Date of Patent: May 2, 2023

(54) FOLDABLE CONVEYOR WITH DEPLOYABLE SKIRTING

(71) Applicant: Terex GB Limited, Dungannon (GB)

(72) Inventors: Brendan Keown, Enniskillen (GB); Ryan McKernan, Dungannon (GB)

(73) Assignee: Terex GB Limited, Dungannon (GB)

( * ) Notice: Subject to any disclaimer, the term of this patent is extended or adjusted under 35 U.S.C. 154(b) by 0 days.

(21) Appl. No.: 17/532,210

(22) Filed: Nov. 22, 2021

(65) Prior Publication Data
US 2022/0162011 A1    May 26, 2022

(30) Foreign Application Priority Data

Nov. 24, 2020 (GB) .................................... 2018490

(51) Int. Cl.
*B65G 41/00* (2006.01)

(52) U.S. Cl.
CPC .................. *B65G 41/007* (2013.01)

(58) Field of Classification Search
CPC . B65G 41/007; B65G 21/2081; B65G 11/106
See application file for complete search history.

(56) References Cited

U.S. PATENT DOCUMENTS

| 3,828,916 A * | 8/1974 | Patz ...................... B65G 21/10 |
| | | 198/735.5 |
| 4,462,520 A | 7/1984 | Strehlow |
| 4,478,548 A * | 10/1984 | Heimes ............... A01D 90/105 |
| | | 414/502 |
| 4,848,534 A * | 7/1989 | Sandwall ............. B65D 90/582 |
| | | 105/247 |
| 6,170,646 B1 | 1/2001 | Kaeb et al. |
| 9,055,714 B2 * | 6/2015 | Hoppel ................ A01D 42/005 |
| 2002/0139643 A1 | 10/2002 | Peltier et al. |

OTHER PUBLICATIONS

Search Report for Application GB2018490.9, dated May 11, 2021, one page.

\* cited by examiner

*Primary Examiner* — William R Harp
(74) *Attorney, Agent, or Firm* — Warner Norcross + Judd LLP

(57) ABSTRACT

A conveyor comprises a first conveyor section and a second conveyor section that is foldable with respect to the first conveyor section. Skirting is movable into and out of a deployed state in which it extends along the second conveyor section. A skirting support is coupled to the skirting and is movable into and out of a deployed state in which it holds the skirting in the deployed state. Actuating device is provided for moving the skirting support. The skirting is deformable or foldable so that it does not have to be removed or fitted when the conveyor is folded or deployed, and is less susceptible to damage.

20 Claims, 11 Drawing Sheets

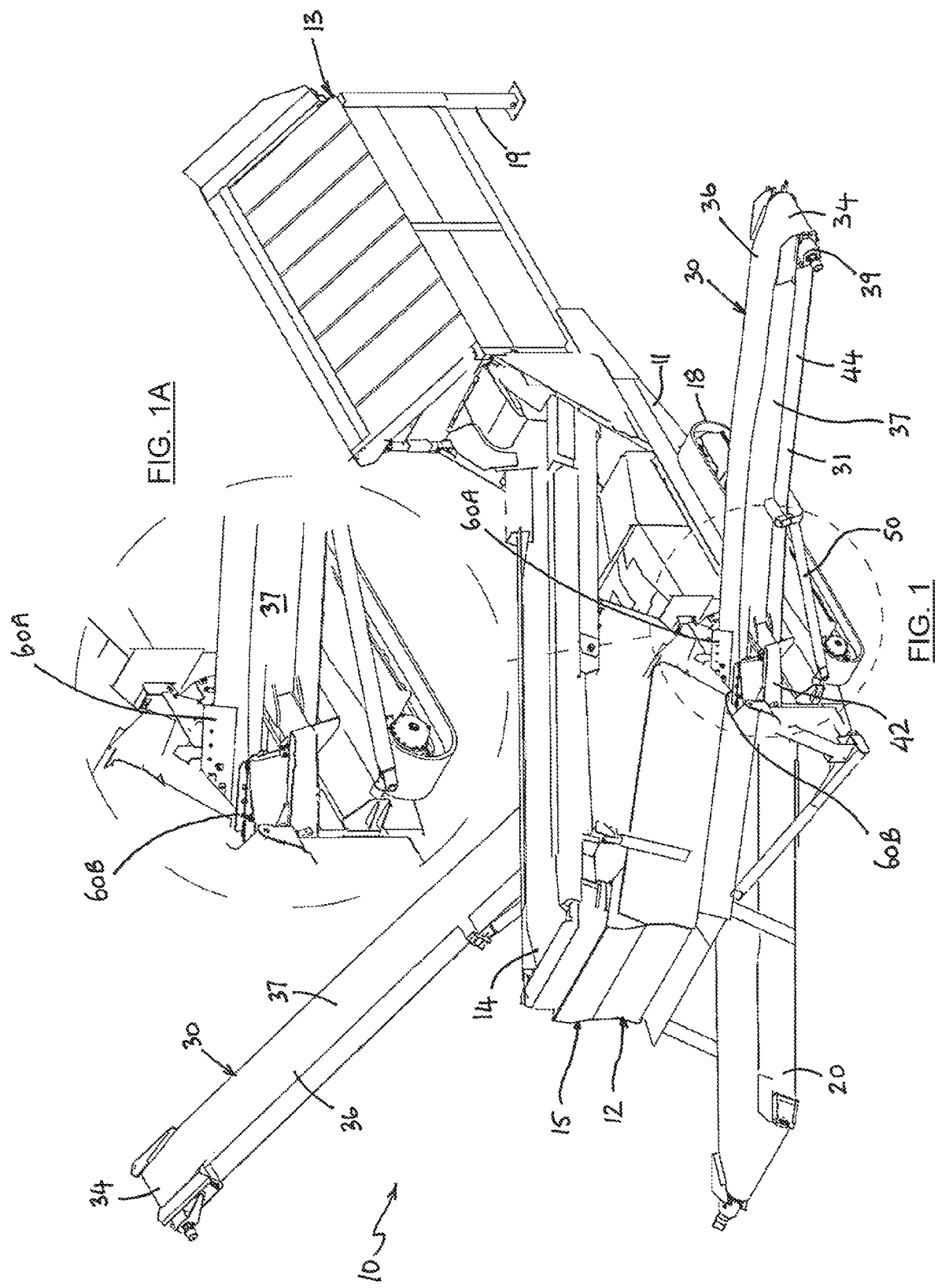

FOLDABLE CONVEYOR WITH DEPLOYABLE SKIRTING

FIELD OF THE INVENTION

The present invention relates to foldable conveyors and to conveyor skirting for same. The invention relates particularly to foldable conveyors for aggregate material.

BACKGROUND TO THE INVENTION

Conveyors for aggregate material are well known and may be provided as a part of a stand-alone conveying machine, for example a stockpiler, or incorporated into material processing apparatus that perform other operations, such as screening, washing and/or crushing, on the material being processed. It is also known to provide skirting at the sides of the conveyor, in particular in the region of the feed end, to help prevent spillage and to centralise the material on the conveyor.

Commonly, such conveyors are foldable to facilitate transport. If the skirting is left in place during folding it can be damaged by the folding action. Commonly, the skirting is removed manually before folding and is installed manually when the conveyor is unfolded. This is time consuming, requires suitable tools to be available, and requires the skirting to be stored during transport. In addition, manual fitting and removal exposes the user to danger since it requires him/her to be in close proximity to the machine.

It would be desirable to mitigate the problems outlined above.

SUMMARY OF THE INVENTION

A first aspect of the invention provides a conveyor comprising a first conveyor section and a second conveyor section movable with respect to said first conveyor section between a deployed state and a non-deployed state, the conveyor further comprising: at least one skirting movable into and out of a deployed state in which said at least one skirting extends along the second conveyor section; at least one skirting support coupled to said at least one skirting and movable into and out of a deployed state in which said at least one skirting support holds said at least one skirting in its deployed state; and actuating means for moving said at least one skirting support, wherein said at least one skirting is deformable or foldable.

Preferably, said at least one skirting is formed from a flexible material, optionally a flexible, non-resilient material.

Preferably, said at least one skirting comprises at least one rigid or semi-rigid section, optionally a plurality of rigid or semi-rigid sections interconnected by at least one joint.

Preferably, the, or each, skirting support is movable between said deployed state in which the skirting support holds the respective skirting in a raised position, with respect to said second conveyor section, and a non-deployed state in which the respective skirting adopts a lowered position with respect to said second conveyor section.

Preferably, the, or each, skirting is coupled to the respective skirting support at a first coupling point, and wherein the skirting support is movable between said deployed state in which said coupling point is in a raised position with respect to said second conveyor section, and a non-deployed state in which the coupling point is in a lowered position with respect to said second conveyor section.

Preferably, the, or each, skirting is coupled to the respective skirting support by a flexible line, said flexible line preferably being spring-tensioned. Said flexible line may be coupled between said skirting support and said first conveyor section. Advantageously, when the skirting is in its deployed state said flexible line holds said skirting in tension, and wherein when the skirting is in its non-deployed state said flexible line does not hold said skirting in tension.

Preferably, the or each skirting is movable between said deployed state and a non-deployed state in which the skirting adopts a lowered position with respect to said second conveyor section in comparison with a position of said skirting in its deployed state.

Preferably, the or each skirting is movable between said deployed state and a non-deployed state in which the skirting is deformed with respect to the deployed state of the skirting.

Preferably, the or each skirting is coupled between the first conveyor section and said second conveyor section such that movement of the movable section from its non-deployed state to its deployed state causes the skirting to adopt its deployed state, and movement of the second conveyor section from its deployed state to its non-deployed state causes the skirting to adopt a non-deployed state.

Preferably, said actuating means is configured to move the or each skirting support between its deployed state and a non-deployed state.

Preferably, the or each skirting support is pivotably coupled to the second conveyor section for pivoting movement between its deployed state and a non-deployed state.

Preferably, said second conveyor section is pivotable with respect to said first conveyor section, preferably about a pivot axis that extends transversely of the first and second conveyor sections, and which, preferably, is perpendicular to the longitudinal axis of the conveyor when deployed.

Typically, said first conveyor section is a base section of the conveyor, the base section optionally including a feed chute.

In some embodiments, said actuating means comprises a linkage coupled between the skirting support and the first conveyor section, or other suitable base structure, such that movement of the second conveyor section between its deployed and non-deployed states causes the linkage to move the skirting support between its deployed and non-deployed states. The linkage may comprise at least one rigid structure. The linkage may be pivotably coupled to the first conveyor section, or other suitable base structure, and to the skirting support. The linkage may be coupled to the skirting support at a second coupling point such that the pivot axis of said skirting support is located between the second coupling point and the point at which the respective skirting is coupled to the skirting support, and wherein, preferably, the arrangement is such that, movement of the second conveyor section towards its non-deployed state, causes the pivot axis to move closer to a point at which the linkage is coupled to the first conveyor section or other base structure to cause the skirting support to pivot towards its non-deployed state, and movement of the second conveyor section towards its deployed state, causes the pivot axis to move further away from the point at which the linkage is coupled to the first conveyor section or other base structure to cause the skirting support to pivot towards its deployed state.

In some embodiments, said actuating means comprises a linkage coupled between the skirting support and the first conveyor section, or other base structure, wherein the linkage comprises a flexible line, and wherein resilient biasing means are coupled between the skirting support and the second conveyor section, or other base structure, and arranged to urge the skirting support into its non-deployed state, and wherein when the second conveyor section is in its deployed state, tension in the line holds the skirting support in its deployed state against the bias of resilient biasing means, and wherein movement of the second conveyor section out of its deployed state, causes the line to be detensioned to allow the resilient biasing means to move the skirting support towards its non-deployed state.

In some embodiments, the or each skirting support is movable from its deployed state to its non-deployed state by engagement with an abutment surface as the second conveyor section moves into its non-deployed state.

In some embodiments, said actuating means comprises resilient biasing means configured to urge the or each skirting support to adopt its deployed state.

In some embodiments, the actuating means comprises an actuator, preferably a linear actuator such as a hydraulic ram or electric linear actuator.

From another aspect the invention provides a material processing apparatus comprising at least one material processing device and at least one conveyor of the first aspect of the invention, said at least one conveyor being arranged to feed material to or from said material processing apparatus and/or to or from said at least one material processing device.

Advantageously, in preferred embodiments, the skirting is capable of being deformed or folded so that it does not have to be removed or fitted when the conveyor is folded or deployed, and is less susceptible to damage.

Further advantageous aspects of the invention will be apparent to those ordinarily skilled in the art upon review of the following description of specific embodiments and with reference to the accompanying drawings.

BRIEF DESCRIPTION OF THE DRAWINGS

Embodiments of the invention are now described by way of example and with reference to the accompanying drawings in which like numerals are used to denote like parts and in which:

FIG. 1 is a perspective view of a material processing apparatus embodying one aspect of the invention and including a first embodiment of a foldable conveyor embodying another aspect of the invention.

FIG. 1A is a detailed view of the apparatus of FIG. 1 showing part of the first embodiment of the foldable conveyor including conveyor skirts;

FIG. 4A is a detailed view of the first embodiment of the conveyor when folded, showing the conveyor skirts;

DETAILED DESCRIPTION OF THE DRAWINGS

Figure 2A:
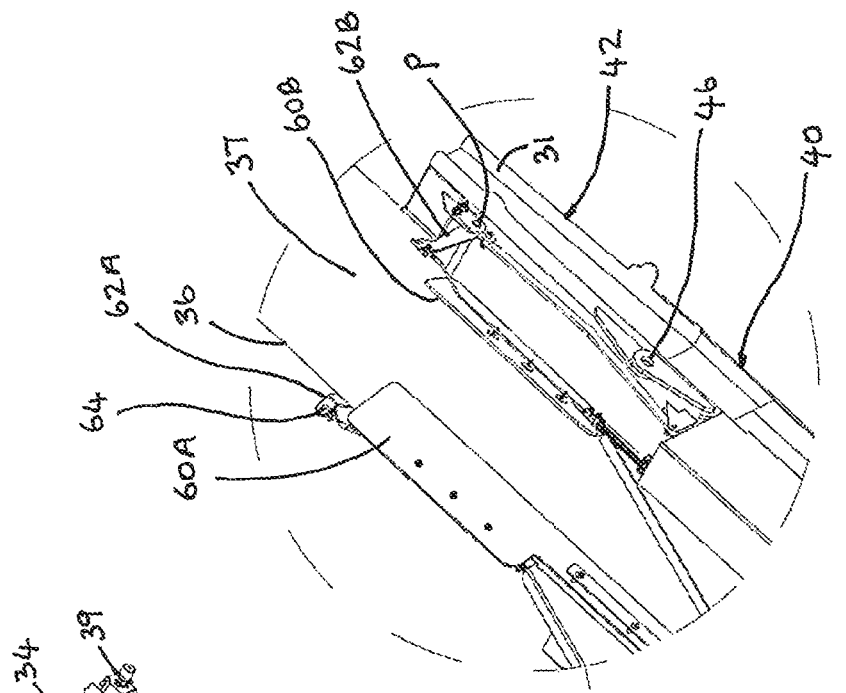
FIG. 2A is a detailed view of the first embodiment of the foldable conveyor when deployed, showing the conveyor skirts.

Referring now to drawings there is shown, generally indicated as 10, a perspective view of a material processing apparatus embodying one aspect of the invention. Depending on the embodiment, the apparatus 10 may be configured to perform any one or more of a plurality of processes, such as feeding, conveying, screening, separating, crushing, breaking, recycling, shredding, demolition and/or washing, on one or more types of aggregate or other material, for example rocks, stones, gravel, waste, sand and/or soil, or any other material, especially but not exclusively, material that is quarried, mined, excavated or requires breaking, recycling or sorting. To this end, the apparatus 10 typically includes one or more material processing unit 12 configured to perform one or more of the foregoing processes. In the illustrated embodiment, the material processing unit 12 is a screening apparatus, usually referred to as a screen. It will be understood that the invention is not limited to use with screens and may be employed with other types of material processing unit. Moreover, the invention is not limited to use with material processing apparatus and may be used with other machines that require a conveyor, or stand-alone conveyor machines such as stockpilers.

The illustrated apparatus 10 includes a feeder unit 13 for delivering material to the material processing unit 12, usually via a main conveyor 14. The feeder unit 13 may take any conventional form, typically comprising a hopper and optionally a feed conveyor and/or a screen.

The apparatus 10 includes at least one conveyor 20, 30 for receiving material processed by the processing unit 12 and outputting the received material from the apparatus 10, e.g. to a stockpile, or to another machine or apparatus (not shown). Such conveyors 20, 30 are sometimes referred to as outfeed conveyors. In the illustrated embodiment, the apparatus 10 includes a front conveyor 20 and first and second side conveyors 30 provided on opposite sides of the apparatus 10. Typically, the conveyors 20, 30 receive material of different grades. The conveyors 20, 30 may receive material directly from the processing unit 12, or indirectly via one or more other conveyor (not shown) depending on the embodiment. Alternative embodiments may have more or fewer conveyors.

The apparatus 10 comprises a base structure, or chassis, 11 which carries the (or each) material processing unit 12, the conveyors 20, 30 and associated components as required. In typical embodiments, the apparatus 10 is mobile or semi-mobile and comprises one or more wheels and/or tracks 18 mounted on the chassis 11 for conveying the apparatus on a ground surface. The apparatus 10 includes drive means for driving the wheels and/or tracks 18 and other components (including the material processing unit(s) and conveyor(s)) as required. The drive means typically comprises a plurality of motors (typically hydraulic or electric) and/or an engine as required. The illustrated apparatus 10 is semi-mobile with the feed unit 13 supported by legs 19. The feed unit 13 may be removed before transport.

The side conveyors 30 embody a second aspect of the invention. Each conveyor 30 has a feed end 32 (commonly referred to as the tail), a discharge end 34 (commonly referred to as the head) and conveying means 36 configured to convey material from the feed end 32 to the discharge end 34 on a conveying surface 37. In the present example, the conveying means 36 comprises a conveying belt but it could alternatively comprise other conveying mechanisms, e.g. rollers. The conveyor 30 comprises a support structure 31 for supporting the conveying means 36. The support structure 31 may carry troughing rollers (not shown) for shaping the conveying belt 36, and end rollers (not visible) at each end around which the belt 36 runs. At least one of the end rollers is driven by any convenient drive means 39, typically a motor. It is noted that the conveying belt 36 is not shown in FIGS. 4 and 4A.

Typically, a feed chute 33, which is sometimes referred to as a feedboot, is provided at the feed end 32 of the conveyor 30. The feed chute 33 typically comprises one or more wall sections 38 extending around the feed end 32, typically across the end of the conveyor 30 and along part of each side at the feed end 32. The feed chute 33 facilitates feeding material onto the feed end 32 so that it may be conveyed to the discharge end 34. The wall sections 38 at the sides of the feed end 32 to help prevent spillage and to centralise material on the conveyor.

When installed on the apparatus 10, the feed end 32 of the conveyor 30 is mounted on the chassis 11 and positioned so that material can be fed onto the feed end 32, e.g. from the screen 12 in the illustrated example.

In FIG. 1, each side conveyor 30 is shown in a deployed state in which it extends outwardly from the main body 15 of the apparatus 10 with its feed end 32 located at (proximal) the body 15 and its discharge end 34 located away from (distal) the body 15 and is configured to convey material from the feed end 32 to the discharge end 34. To facilitate transport of the apparatus 10, the conveyor 30 is foldable into a folded, or transport, state. Advantageously, in the transport state, the conveyor 30 is folded against or alongside the body 15 of the apparatus 10. As such, the overall dimensions of the apparatus 10 are reduced in order to facilitate transport and/or storage of the apparatus 10.

To facilitate folding, the conveyor 30 comprises a first conveyor section 40 and a second conveyor section 42 that is foldable or otherwise movable with respect to the first section 40. In typical embodiments, the first section 40 corresponds to the feed end 32 of the conveyor 30 and may therefore be referred to as a base section of the conveyor. In the illustrated embodiment, the conveyor 30 includes a third conveyor section 44 that is foldable or otherwise movable with respect to the second section 42. In other embodiments (not illustrated), the third section 44 may be omitted (i.e. only the first section 40 and second section 42 are present), or one or more additional foldable conveyor sections may be provided. When the conveyor 30 is in the deployed state, the foldable section(s) 42, 44 are unfolded and aligned with each other to allow the conveyor 30 to convey material from the feed end 32 to the discharge end 34.

Figure 2:
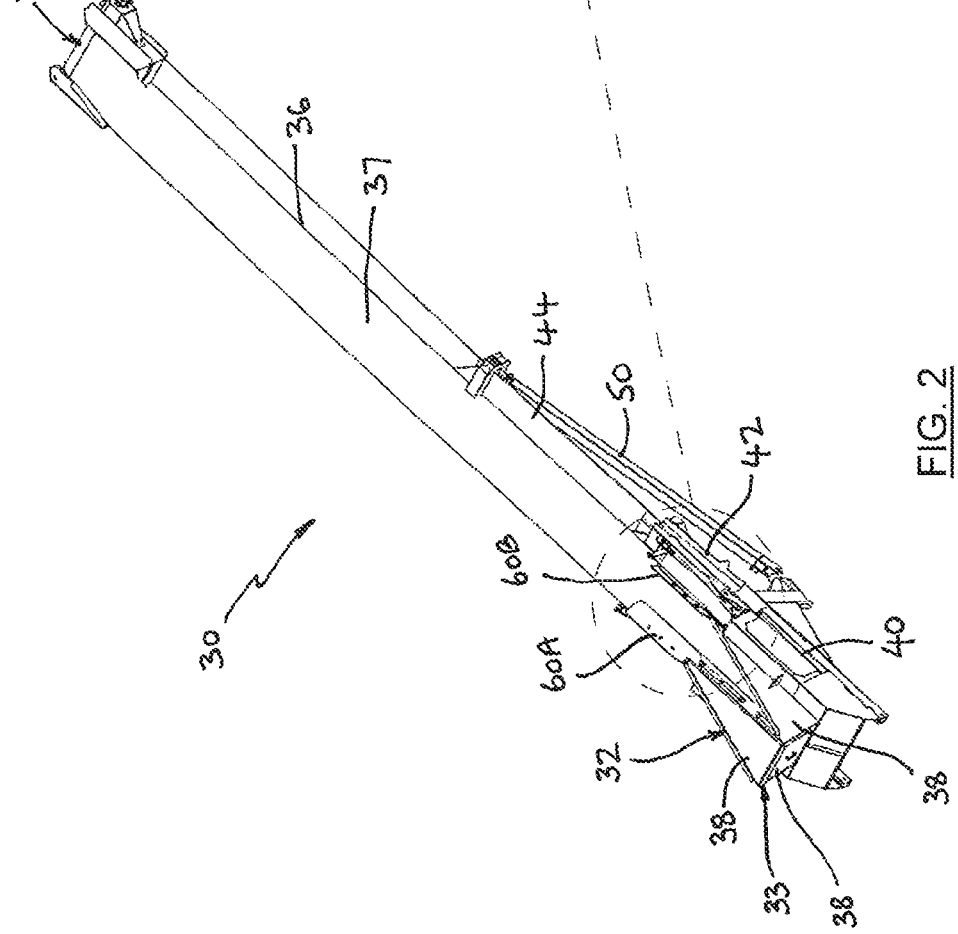
FIG. 2 is a perspective view of the first embodiment of the foldable conveyor shown in a deployed state.

The second section 42 is coupled to the first section 40 by any convenient moving joint(s) or folding mechanism, for example comprising one or more hinge 46 or pivot joint(s). Preferably, the folding mechanism pivotably couples the second section 42 to the first section 40. The preferred configuration is such that the second section 42 is pivotable with respect to the first section 40 about an axis that runs transversely of the conveyor 30, in particular an axis that is perpendicular to the longitudinal or conveying axis of the conveyor 30 when deployed (or unfolded). The pivot axis may lie in or parallel with the plane of the main conveying surface 37 when the conveyor is deployed. When the second section 42 is deployed, or unfolded, (see for example FIGS. 2, 2A and 3) it is aligned with the first section 40 to allow material to be conveyed from the first section 40 to the second section 42. As such, the first section 40 and second section 42 are both aligned with the longitudinal, or conveying, axis of the conveyor 30. In preferred embodiments, when the second section 42 is in its folded, or non-deployed, state (see for example FIGS. 4, 4A and 5), it is disposed obliquely or perpendicularly with respect to the first section 40. In typical embodiments, the arrangement is such that the second section 42 pivots upwardly from its unfolded state to its folded state, and downwardly from its folded state to its unfolded state.

The third foldable section 44 is coupled to the second foldable section 42 by any convenient moving joint(s) or folding mechanism, for example comprising one or more pivot joint 48 or hinge(s). Preferably, the folding mechanism pivotably couples the third section 44 to the second section 42. The preferred configuration is such that the third section 44 is pivotable with respect to the second section 42 about an axis that runs perpendicularly to the conveying surface of the conveyor 30. When the third section 44 is unfolded (see for example FIGS. 2, 2A and 3) it is aligned with the first section 40 and second section 42 to allow material to be conveyed from the first section 40 to the third section 44. As such, the first section 40, second section 42 and third section 44 are each aligned with the longitudinal, or conveying, axis of the conveyor 30. When the third section 44 is folded (see for example FIGS. 4, 4A and 5), it is disposed obliquely or perpendicularly with respect to the second section 42 and the conveying axis of the conveyor 30. In the illustrated example, the conveyor 30, or more particularly the third section 44, is laterally folding. In alternative embodiments in which a second conveyor section is present it may fold in any other convenient manner. For example, in an up-and-over type conveyor the third section may fold about an axis that is parallel to the axis about which the second section 42 folds.

In typical embodiments, the support structure 31 is formed in sections as described above. The conveying belt 36 is typically flexible and inherently foldable or deformable.

Figure 5:
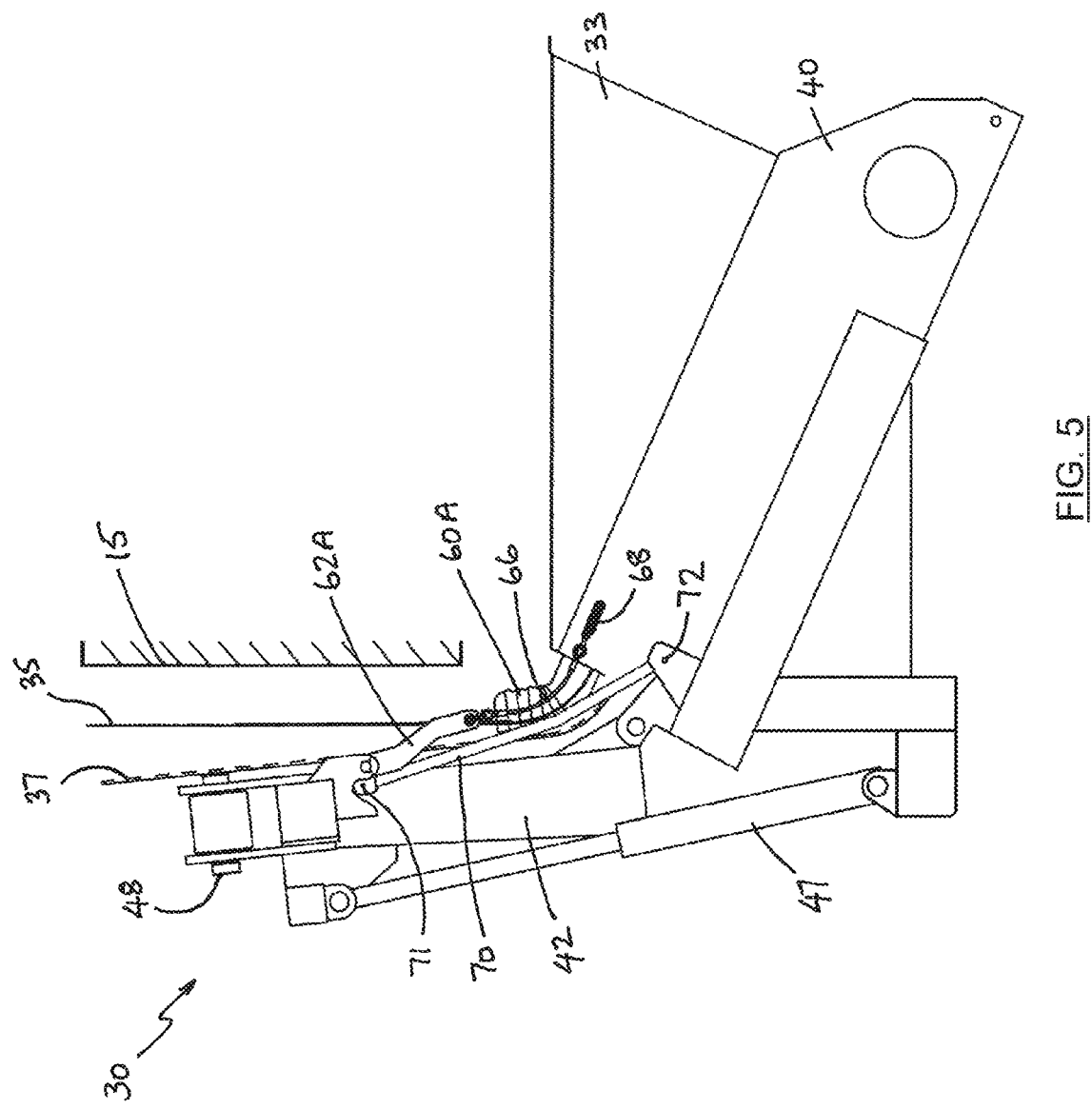
FIG. 5 is a side view of part of the first embodiment of the foldable conveyor in the folded state.

Typically, one or more powered actuators are provided for moving each movable section of the conveyor 30 in order to fold and unfold the conveyor as described above. The actuator(s) may be of any suitable conventional type, for example linear actuators such as hydraulic ram(s) or electric linear actuator(s). As can best be seen from FIGS. 3 and 5, one or more linear actuator 47 (only one shown), which in this example is a hydraulic ram, acts on the second section 42 to move it between its deployed or unfolded state (FIG. 3) and its non-deployed or folded state (FIG. 5). Conveniently, the actuator 46 is coupled between the second section 42 and the first section 40, but may alternatively be coupled between the second section 42 and the body 15 of the apparatus 10. In the illustrated embodiment, extension of the actuator 47 moves the second section 42 from the deployed state to the non-deployed state, and retraction of the actuator 47 moves the second section 42 from the non-deployed state to the deployed state, although the reverse operation may apply depending on where the actuator 46 is located.

Figure 4:
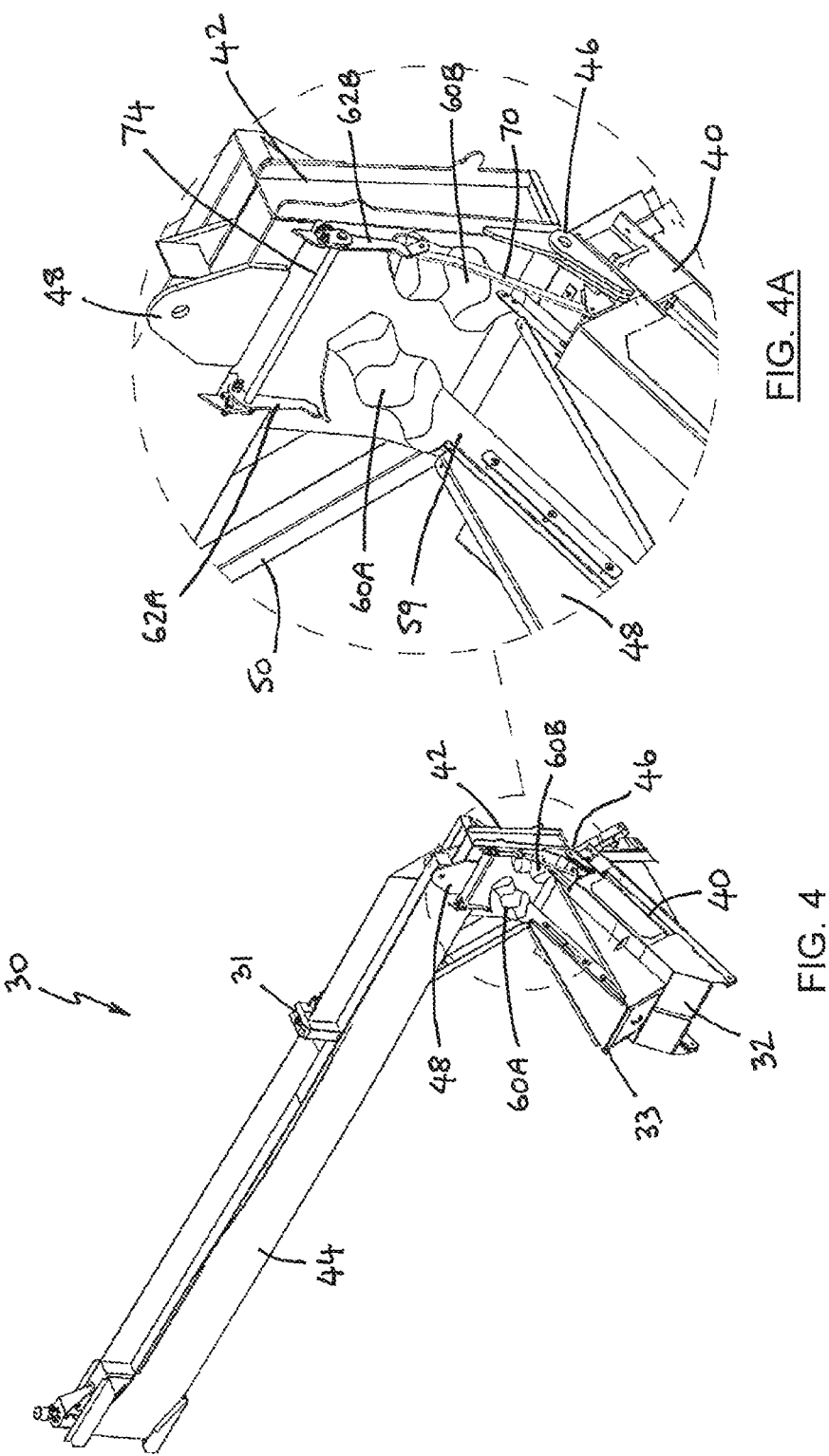
FIG. 4 is a perspective view of the first embodiment of the foldable conveyor shown in a folded state.

Although not shown, one or more linear actuator, e.g. a hydraulic ram, acts on the third section 44 to move it between its deployed/unfolded state (FIG. 2) and its non-deployed/folded state (FIG. 4). The actuator(s) may be coupled between the third section 44 and any one of the second section 42, first section 40 or body 15 as is convenient.

Optionally, a stay 50, is coupled between the conveyor 30 (typically the third section 44 of the conveyor) and the body 15. Alternatively, the stay 50 may be coupled between the third section 44 and the first section 40. The stay 50 supports the conveyor 30, particularly when deployed and when moving between the deployed and transport states. Advantageously, the stay 50 helps to control the movement of the conveyor 30 between the deployed and transport states. The stay 50 may be coupled to the conveyor 30 and the body 15, as required, using any suitable pivot joint(s). The stay 50 may be telescopically extendible or of fixed length depending on the configuration of the conveyor 30.

In typical embodiments, the feed chute 33 does not extend beyond the first section 40 of the conveyor 30. The second section 42 of the conveyor 30 is adjacent the first section 40 and it is desirable to provide additional skirting at the sides of the second section 42 to help prevent spillage from the sides of the second section 42 and to centralise material on the conveyor 30. The conveyor 30 is provided with a skirt or skirting 60A, 60B for each side of the second section 42. The skirting 60A, 60B when deployed (see for example FIGS. 2, 2A and 3) extends along a respective side of the second section 42. When deployed, the skirtings 60A, 60B are spaced apart from one another on opposite sides of the main conveying surface 37. The skirtings 60A, 60B typically run parallel or substantially parallel with each other, and may be aligned with the longitudinal axis of the conveyor when deployed. Each skirting 60A, 60B is typically disposed perpendicularly or obliquely with respect to the conveying surface 37 when deployed. Typically, the conveyor belt 36 is troughed, or concave, such that the main conveying surface 37 is provided by a central portion of the belt 36. In such cases, the belt 36 may be U-shaped or otherwise concave in transverse cross-section such that its sides extend upwardly from the central portion or main conveying surface 37. If the belt 36 is troughed, the skirting 60A, 60B, when deployed, may be located between the troughed sides of the belt 36 (typically each skirting 60A, 60B extends alongside a respective troughed side) and disposed perpendicularly or obliquely with respect to the main conveying surface 37. In use, material being conveyed along the second section 42 on the conveying surface 37 passes between the skirtings 60A, 60B which help to retain the material on the conveyor 30. In FIGS. 3 and 5 to 11, the top of the troughed sides is indicated as 35 while the main conveying surface is indicated as 37.

Each skirting 60A, 60B is deformable or foldable. In preferred embodiments, the skirting 60A, 60B is made from a flexible material, optionally a non-resilient, flexible material. Advantageously, the flexibility of the material allows the skirting to be folded or otherwise deformed from a non-deformed state and returned to the non-deformed state as required. The skirting is preferably made from rubber, but may alternatively be made from other flexible material, e.g. flexible plastics, textile, mesh or netting. When in its deployed, or non-deformed, state, the skirting 60A, 60B is preferably planar or panel-like in shape, e.g. substantially rectangular. The skirting 60A, 60B is preferably solid-bodied, but need not necessarily be, e.g. in the case where it is formed from netting. In alternative embodiments (not illustrated) the skirting 60A, 60B may be deformable or foldable by other means, for example being formed from a plurality of skirting sections, each of which may be rigid or semi-rigid, that are coupled together by one or more folding joints.

The skirting 60A, 60B is coupled between the first section 40 and the second section 42 such that, when the second section 42 is unfolded with respect to the first section 40, the skirting 60A, 60B adopts its deployed state, and when the second section 42 is folded with respect to the first section 40 the skirting 60A, 60B adopts a non-deployed, or deformed, state. In preferred embodiments, the arrangement is such that the movement of the second section 42 with respect to the first section 40 causes the skirting 60A, 60B to move between its deployed and non-deployed states. In particular, movement of the second section 42 from the non-deployed state to the deployed state causes the skirting to deploy, and movement of the second section 42 from the deployed state to the non-deployed state causes the skirting 60A, 60B to adopt its non-deployed state in which it is deformed, e.g. bent, twisted, buckled and/or folded as applicable, with respect to its form in its deployed state. It is noted that the skirting 60A, 60B may be but need not necessarily be connected directly to the first section 40. Coupling means is provided for coupling the skirting 60A, 60B to the first section 40 in order to effect the movement of the skirting described above and hereinafter.

Typically, a respective skirting support 62A, 62B is provided at a respective side of the second section 42, one for each skirting 60A, 60B. The skirting support 62A, 62B is movable with respect to the second section 42 between a deployed state and a non-deployed state. The skirting 60A, 60B is coupled to the respective skirting support 62A, 62B at a coupling point 64 that is typically located at an end of the skirting support 62A, 62B. When the skirting support 62A, 62B is in its deployed state, the coupling point 64 is in a raised position with respect to the second section 42, e.g. raised with respect to the conveying surface 37, and when the skirting support 62A, 62B is in the non-deployed state the coupling point 64 is in a lowered position with respect to the second section 42, e.g. closer to the conveying surface 37. As such, when the skirting support 62A, 62B is in its deployed state, the skirting 60A, 60B is lifted up and away from the conveying surface 37, and when it its non-deployed state the skirting 60A, 60B is lowered down towards the conveying surface 37. Typically, the arrangement is such that the respective skirting support 62A, 62B is located at or adjacent the forward end 61 of the respective skirting 60A, 60B, or otherwise such that the respective skirting 60A, 60B is located between the first section 40 and the support 62A, 62B.

The skirting 60A, 60B may be coupled to the respective skirting support 62A, 62B by any convenient coupling means. In preferred embodiments, the coupling means comprises a flexible line 66, e.g. a wire, rope, cable or chain, that is preferably spring-tensioned. In the illustrated embodiment, the line 66 is connected to a spring 68, conveniently a tension spring, for spring-tensioning the line 66. Alternatively, the line 66 may be wholly or partly formed from an elastic material. Alternatively still, the line 66 may be connected to a manual tensioning device, or have no tensioning means.

The line 66 is connected or otherwise coupled to the skirting support 62A, 62B, typically at the coupling point 64, and to the respective skirting 60A, 60B. In preferred embodiments the line 66 is also connected or otherwise coupled to the first section 40 of the conveyor 30. The line 66 therefore serves as means for coupling the skirting 60A, 60B to the first section 40. Preferably, one end of the line 66 is coupled to the skirting support 62A, 62B, the other end of the line 66 is coupled to the first section 40, and the respective skirting 60A, 60B is coupled to the line 66 in between the ends. The skirting 60A, 60B may be coupled to the line 66 using any convenient coupling means, for example one or more coupling eye 69 through which the line 66 passes. In the illustrated embodiment, the line 66 is coupled to the first section 40 by spring 68. Alternatively, the spring 68 may be provided at the other end of the line, or be provided at location between the ends of the line 66.

Figure 3:
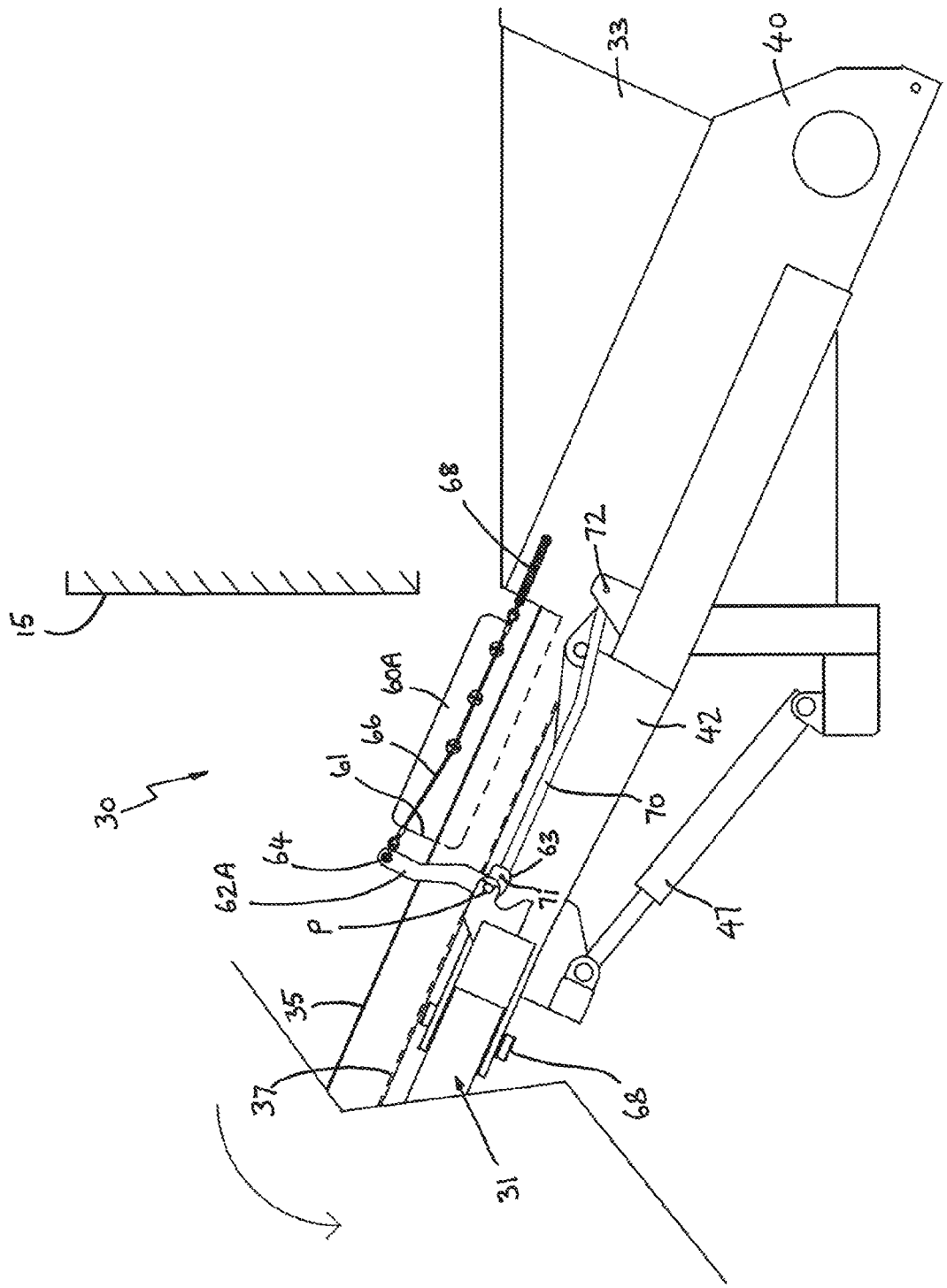
FIG. 3 is a side view of part of the first embodiment of the foldable conveyor in the deployed state.

When the second section 42 of the conveyor 30 is in its deployed state, and the skirting support 62A, 62B is deployed, the line 66 is in a raised position with respect to the second section 42, e. g. raised with respect to the conveying surface, held in tension (typically between the skirting support 62A, 62B and the first section 40) and holds the respective skirting 60A, 60B in its deployed state (see FIG. 3 for example). In preferred embodiments, the line 66 holds the respective skirting 60A, 60B in tension when the skirting is deployed. When the second section 42 is in its non-deployed state and the skirting support 62A, 62B is in its non-deployed state, the line 66 is in a lowered position with respect to the second section 42, e.g. closer to the conveying surface, and causes the respective skirting 60A, 60B to adopt its non-deployed state (see FIG. 4 for example). In preferred embodiments, the line 66 is not tensioned when the second section 42 is in its non-deployed state and the skirting support 62A, 62B is in its non-deployed state. In preferred embodiments, when the line 66 is not tensioned, the respective skirting 60A, 60B is not tensioned which facilitates its deformation or folding into its non-deployed state.

When the second section 42 and skirting support 62A, 62B move from their respective deployed state to their respective non-deployed state, the skirting 60A, 60B is moved from its deployed state to its non-deployed state, during which movement the deformability of the skirting 60A, 60B allows it to deform to accommodate the change in the relative positions of the second section 42 and first section 40. It is preferred that the skirting 60A, 60B is lowered towards, and optionally into contact with, the conveying surface 37 when moving from its deployed to non-deployed state, and its deformability allows it to deform to accommodate this movement. When the second section 42 and skirting support 62A, 62B move from their respective non-deployed state to their respective deployed state, the skirting 60A, 60B is moved from its non-deployed state to its deployed state, during which movement the deformability of the skirting 60A, 60B allows it to deform to accommodate the change in the relative positions of the second section 42 and first section 40. It is preferred that the skirting 60A, 60B is lifted away from the conveying surface 37 when moving from its non-deployed to deployed state, and its deformability allows it to deform to accommodate this movement.

In the embodiment of FIGS. 1 to 5, 6, 7, 10 and 11, the skirting support 62A, 62B is pivotably coupled to the second section 42 of the conveyor 30 for pivoting movement about a pivot axis P. The pivot axis P preferably runs in a transverse direction across the second section 42, preferably perpendicular to the longitudinal or conveying axis of the conveyor 30 when deployed. The support 62A, 62B may take any suitable form typically comprising a bar, arm, lever or other rigid structure. The support 62A, 62B is pivotable between its deployed and non-deployed states such that the coupling point 64 moves downwardly, typically towards the conveying surface, as the support 62A, 62B pivots from the deployed state to the non-deployed state, and moves upwardly, typically away from the conveying surface, as the support 62A, 62B pivots from the non-deployed state to the deployed state. The preferred arrangement is such that the coupling point 64 moves towards the first section 40 (or more particularly from the point at which the line is coupled to the first section 40) as the support 62A, 62B pivots from the deployed state to the non-deployed state, and moves away from the first section 40 ((or more particularly from the point at which the line is coupled to the first section 40) as the support 62A, 62B pivots from the non-deployed state to the deployed state. This arrangement facilitates creating and releasing tension in the line 66 as required.

In preferred embodiments, the skirting 60A, 60B is fixed to the first section 40. As can best be seen from FIG. 4A, a rearward portion 59 of the skirting 60A, 60B may be fixed to the first section. Any conventional fixing devices, e.g. screws, clamps and so on, may be used for this purpose. Optionally, the skirting 60A, 60B is not fixed to the first section 40. For example, the skirting 60A, 60B may be supported by the line 66 without needing to be directly connected to the first section 40. Although it may be said that the skirting 60A, 60B is nevertheless coupled to the first section 40 by the line 66.

Actuating means are provided for moving the skirting support 62A, 62B between its deployed and non-deployed states. In preferred embodiments, the actuating means comprises a linkage 70 coupled between the skirting support 62A, 62B and the first section 40. The configuration is such that movement of the second section 42 relative to the first section 40 causes the linkage 70 to act on the skirting support 62A, 62B to move it between its deployed and non-deployed states. In particular, movement of the second section 42 from its deployed state to its non-deployed state causes the linkage 70 to move the skirting support 62A, 62B from its deployed to its non-deployed state, and movement of the second section 42 from its non-deployed state to its deployed state causes the linkage 70 to move the skirting support 62A, 62B from its non-deployed to its deployed state.

In the embodiment of FIGS. 1 to 5, the linkage 70 comprises at least one rigid structure, for example a bar or rod. The rigid linkage 70 is pivotably coupled to the first section 40 and to the skirting support 62A, 62B. Preferably, the linkage 70 is coupled to a portion 63 of the skirting support 62A, 62B at a coupling point 71 such that the pivot axis P is located between the coupling points 64, 71. The linkage 70 acts on the skirting support 62A, 62B at coupling point 71 to pivot the skirting support 62A, 62B about pivot axis P in a lever-like manner. The preferred arrangement is such that, as the second section 42 moves out of its deployed state towards and into its non-deployed state, the pivot axis P moves closer to the point 72 at which the linkage 70 is coupled to the first section 40. As a result, the action of the linkage 70 on the portion 63 causes the skirting support 62A, 62B to pivot about axis P towards and into its non-deployed state. As the second section 42 moves out of its non-deployed state towards and into its deployed state, the pivot axis P moves further away from the point 72 at which the linkage 70 is coupled to the first section 40. As a result, the action of the linkage 70 on the portion 63 causes the skirting support 62A, 62B to pivot about axis P towards and into its deployed state.

In alternative embodiments, the linkage 70 may be coupled between the skirting support 62A, 62B and the body 15 or other convenient base structure with respect to which the second section 42 moves.

The skirting supports 62A, 62B may be provided independently of each other, or may be interconnected, as is convenient. For example, as can best be seen in FIG. 4A, the skirting supports 62A, 62B on either side of the second section 42 are interconnected by a bar 74 and as such move in unison with each other. In use, the bar 74 is located below the conveyor belt 36. Accordingly, the actuating means is only required for one of the supports 62A, 62B, or for the assembly of which each support 62A, 62B is part. In embodiments where the skirting supports 62A, 62B are not interconnected, respective actuating means are provided.

Figure 6:
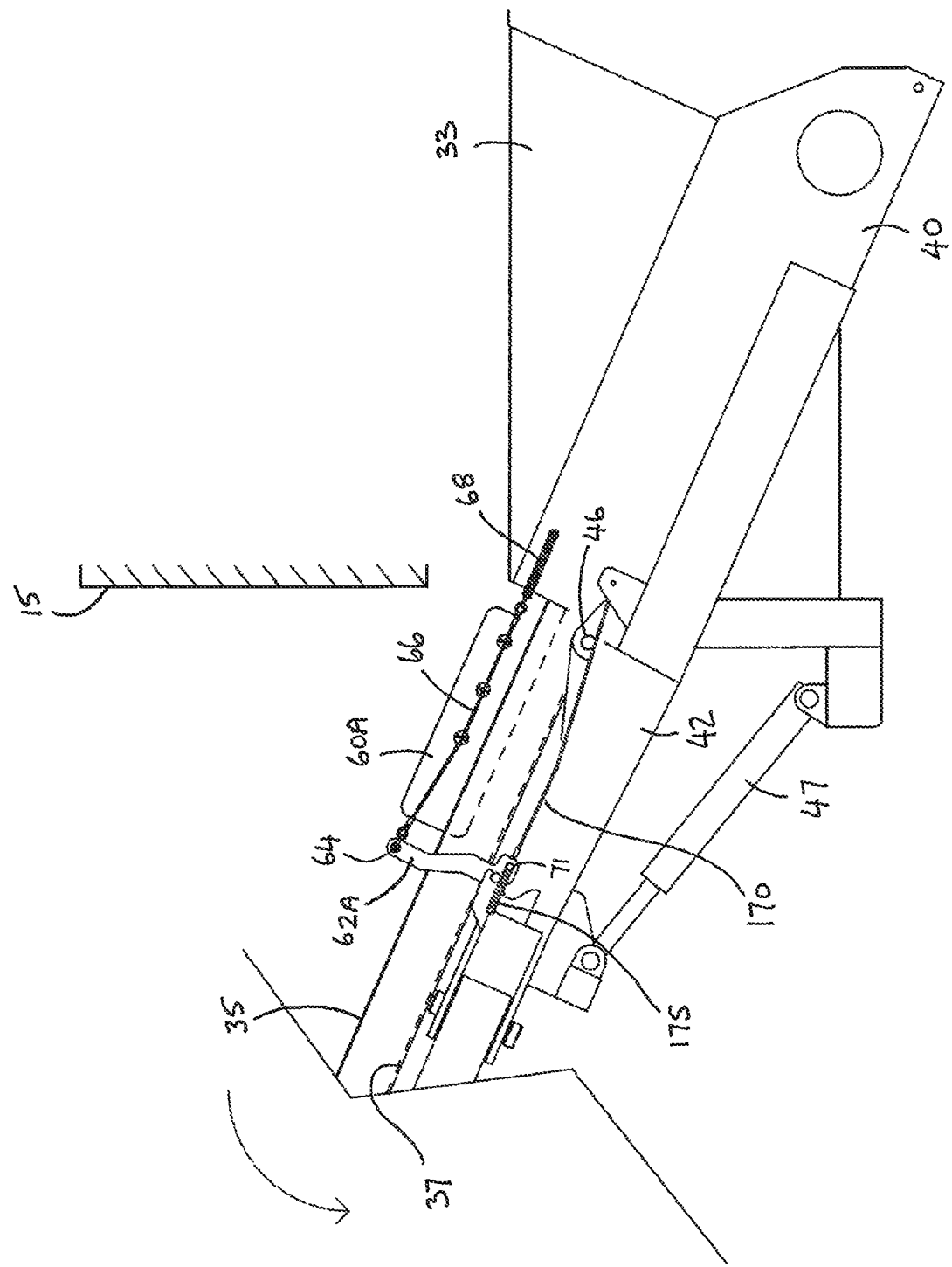
FIG. 6 is a side view of part of a second embodiment of the foldable conveyor in the deployed state.
Figure 7:
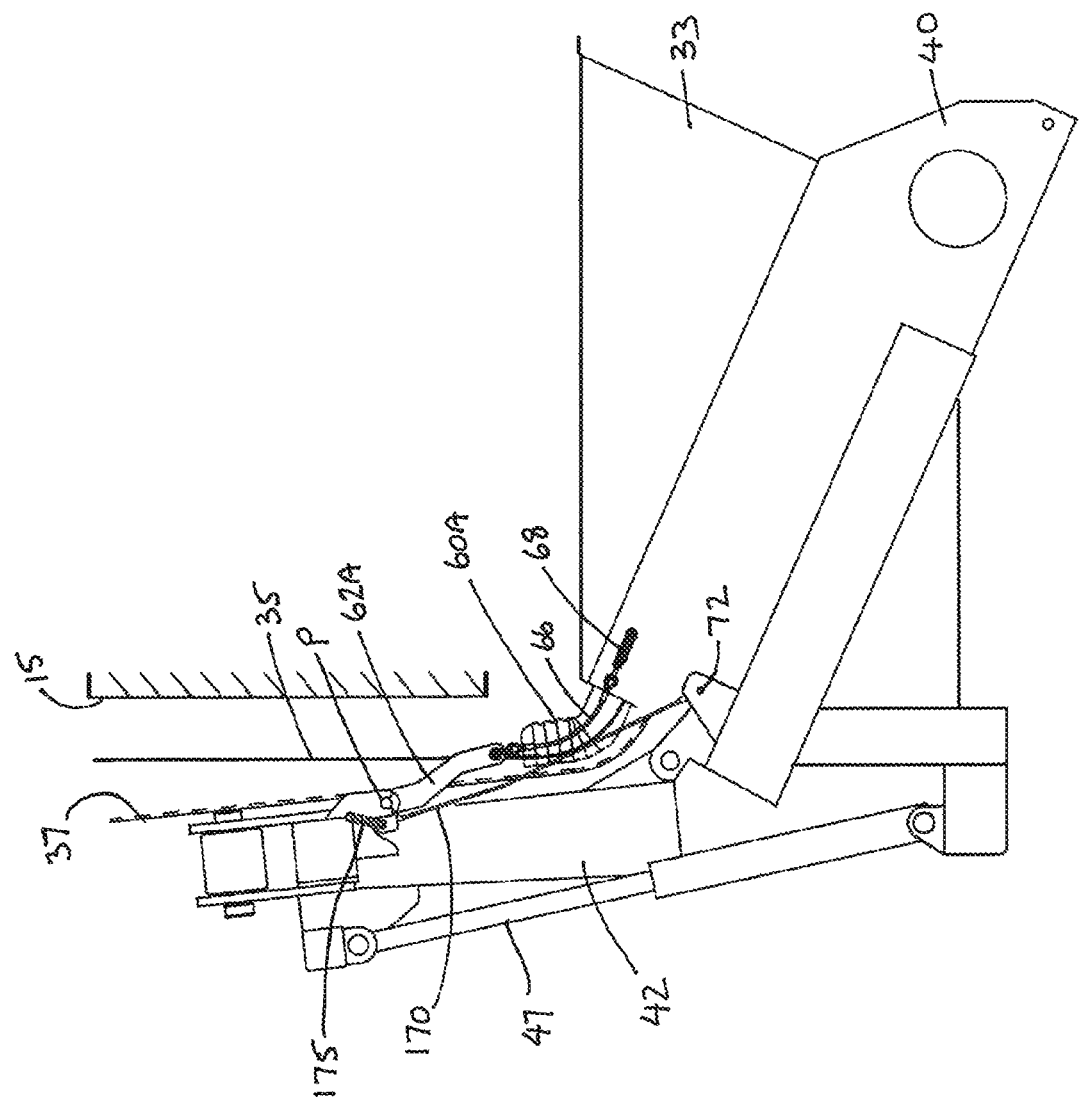
FIG. 7 is a side view of part of the second embodiment of the foldable conveyor in the folded state.

FIGS. 6 and 7 illustrate a second embodiment of a foldable conveyor 130 in which like numerals are used to denote like parts and in respect of which the same description applies as is provided in relation to the embodiment of FIGS. 1 to 5 unless otherwise indicated. In this embodiment, the linkage 170 comprises a flexible, and preferably inelastic, line, e.g. a wire, rope, cable or chain. In addition, resilient biasing means 175, for example one or more spring, are coupled between the skirting support 62A and the second section 42 (or other convenient base structure with respect to which the skirting support is movable) and arranged to urge the skirting support 62A into its non-deployed state. Conveniently, the spring 175 (or other biasing means) is coupled to the coupling point 71. The arrangement is such that, with the second section 42 in its deployed state, the tension in the line 170 holds the skirting support 62A in its deployed state against the bias of the spring 175 (or other biasing means), as shown in FIG. 6. When the second section 42 moves relative to the first section 40 out of the deployed state, the coupling point 71 moves closer to the coupling point 72 with the result that the line 170 is detensioned to allow the biasing means 175 to move the skirting support 62A towards and into its non-deployed state (FIG. 7).

Figure 8:
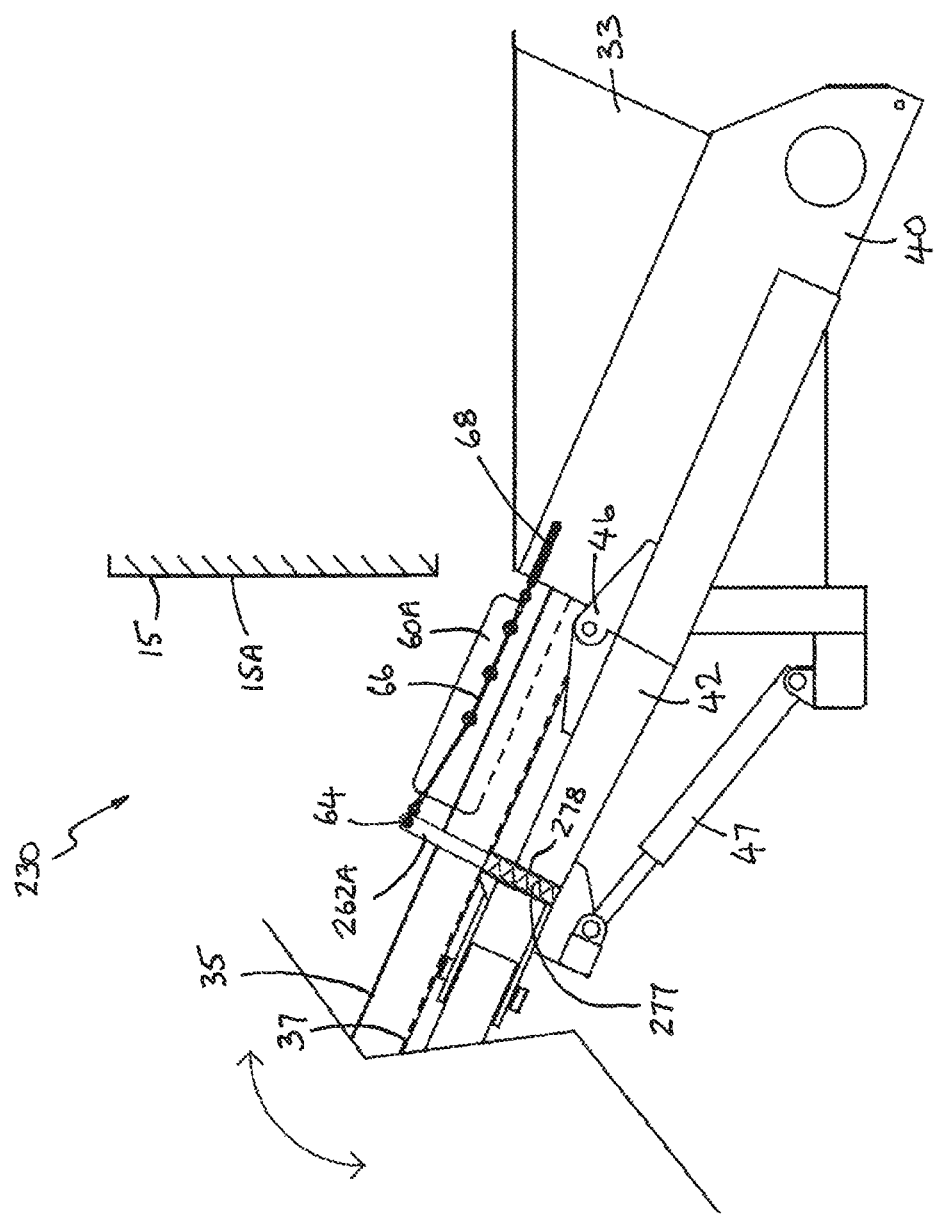
FIG. 8 is a side view of part of a third embodiment of the foldable conveyor in the deployed state.
Figure 9:
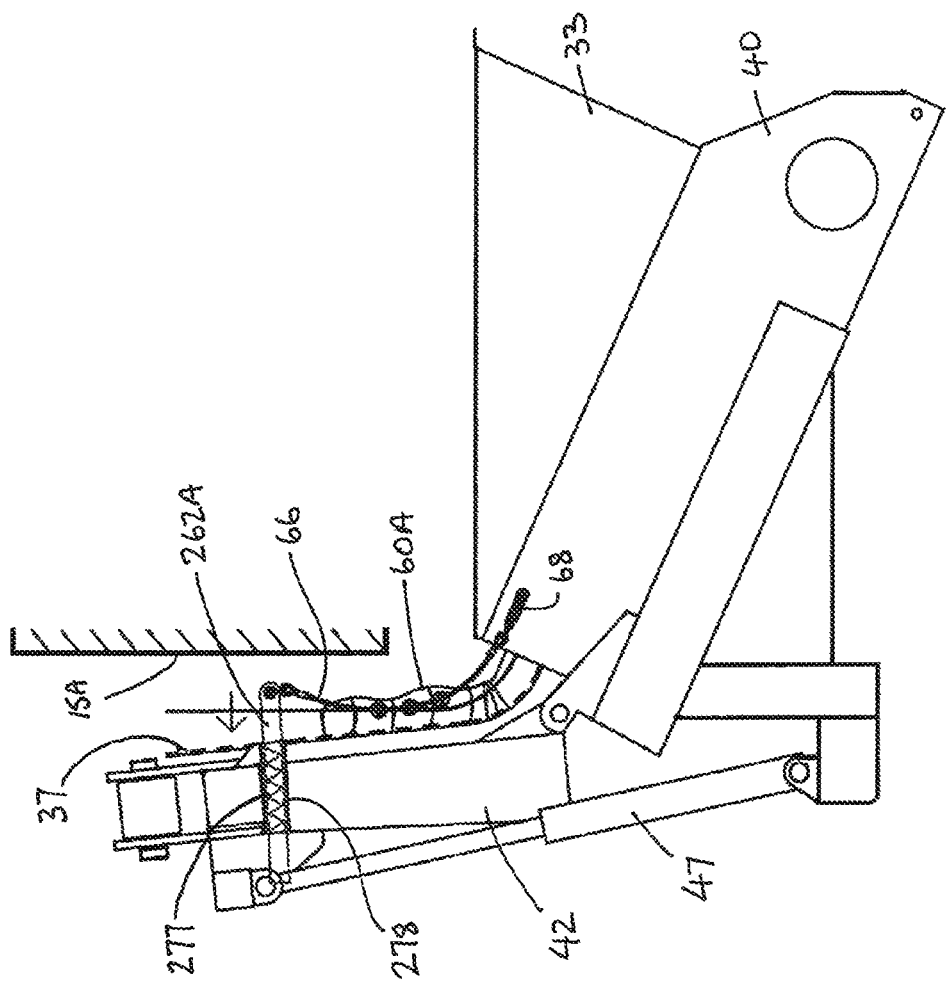
FIG. 9 is a side view of part of the third embodiment of the foldable conveyor in the folded state.

FIGS. 8 and 9 illustrate a third embodiment of a foldable conveyor 230 in which like numerals are used to denote like parts and in respect of which the same description applies as is provided in relation to the embodiment of FIGS. 1 to 5 unless otherwise indicated. In this embodiment, the skirting support 262A is movable with respect to the second section 42 from the deployed state to the non-deployed state by engagement with an abutment surface 15A on the body 15 of the apparatus 10 (or on any other structure adjacent the conveyor) as the second section 42 moves into its non-deployed state. The skirting support 262A is shaped and dimensioned to engage with any convenient part of the body 15 (or other structure) as the second section 42 pivots with respect to the first section 40 such that further movement of the second section 42 towards the non-deployed state after the engagement causes the skirting support 262A to move into its non-deployed state. Preferably, the skirting support 262A is resiliently biased to adopt its deployed state. Any suitable resilient biasing means 277, e.g. one or more springs, may be provided for this purpose. When the skirting support 262A disengages with the body 15 (or other structure) as the second section 42 moves towards its deployed state, the resilient bias acts to move the skirting support 262A to its deployed state. In the illustrated embodiment, the skirting support 262A is movable linearly between its deployed and non-deployed states. The skirting support structure 262A may be slidably or telescopically located in or through a tube 278. The tube 278 may contain a compression spring 277, or other spring or resilient biasing means, arranged to urge the skirting support 262A into its deployed state, e.g. outwardly of the tube 278, to deploy the skirting 60A. In this embodiment, the actuating means for the skirting support 262A is provided by the biasing means 277 and the body 15 (or other structure).

Figure 10:
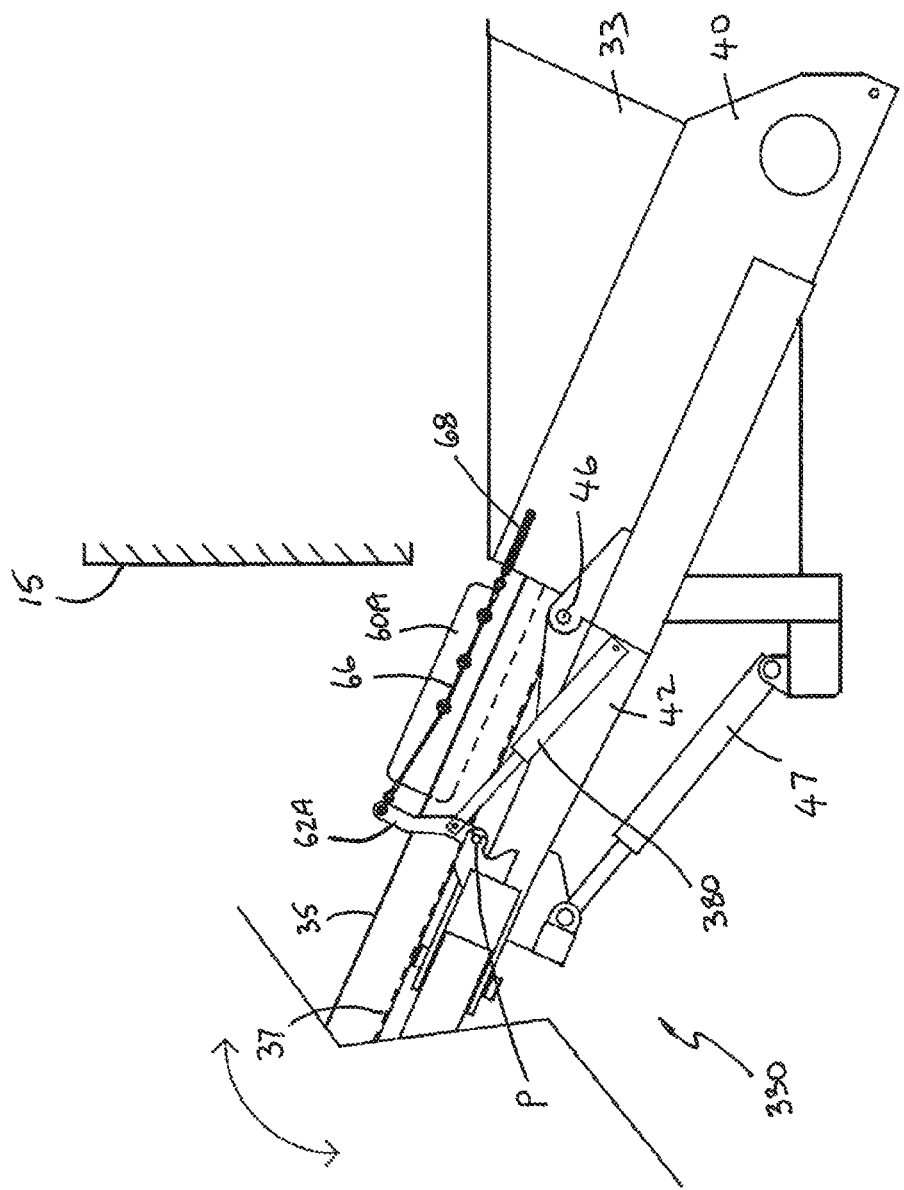
FIG. 10 is a side view of part of a fourth embodiment of the foldable conveyor in the deployed state.
Figure 11:
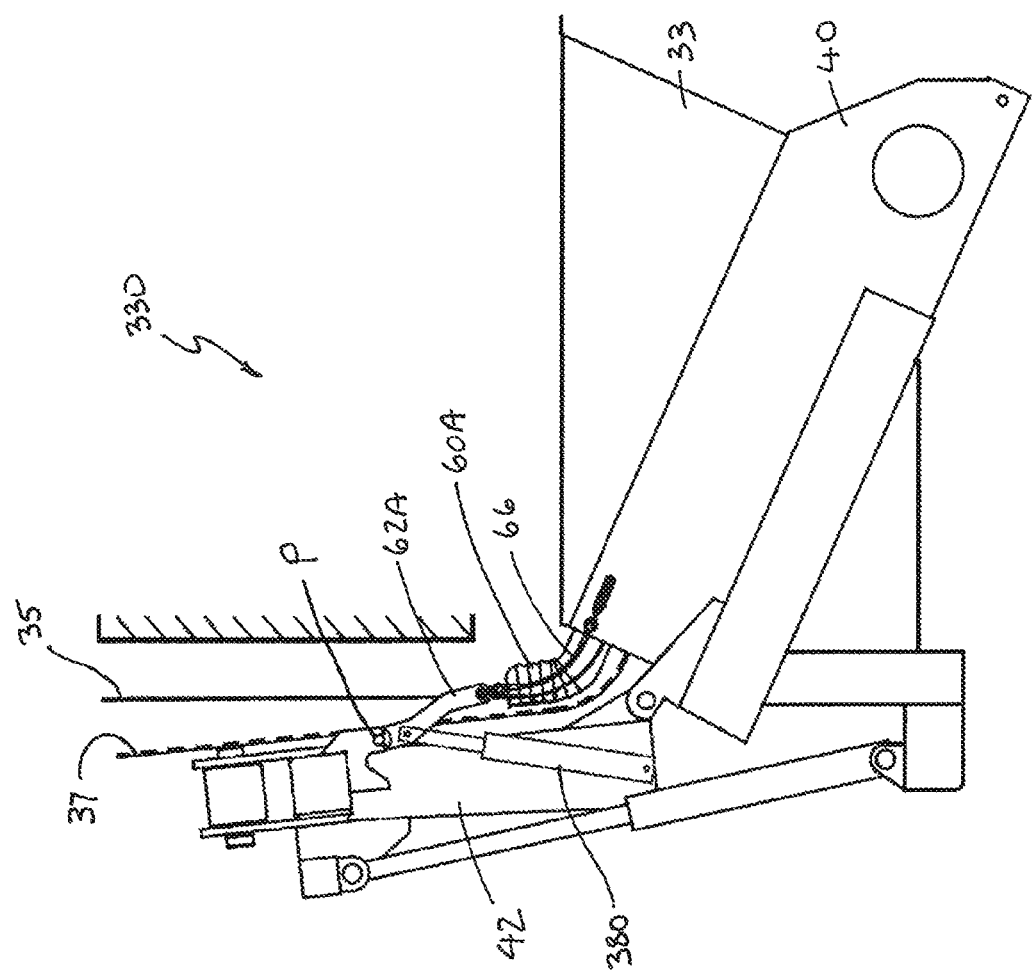
FIG. 11 is a side view of part of the fourth embodiment of the foldable conveyor in the folded state.

FIGS. 10 and 11 illustrate a fourth embodiment of a foldable conveyor 330 in which like numerals are used to denote like parts and in respect of which the same description applies as is provided in relation to the embodiment of FIGS. 1 to 5 unless otherwise indicated. In this embodiment, the actuating means for moving the skirting support 62A between its deployed and non-deployed states comprises an actuator 380, preferably a linear actuator such as a hydraulic ram or electric linear actuator. In the illustrated embodiment, the actuator 380 is coupled between the skirting support 62A and the second section 42 and is operable to pivot the skirting support 62A about pivot axis P. Alternatively, if the skirting support 62A is linearly movable between its deployed and non-deployed states, the actuator 380 may be coupled to the skirting support 62A to effect linear movement.

In typical embodiments, the first section 40 is a base section of the conveyor 30 corresponding to the feed end 32 and typically including the chute 33. In such embodiments, the skirting 60A, 60B may be referred to as a chute extension or feedboot extension. In alternative embodiments, the first section is not the base section of the conveyor and may for example be a mid-section of the conveyor (i.e. a conveyor section that has a respective other section at each end). More generally, the first and second sections may be any two sections of the conveyor, typically any two adjacent conveyor sections (in the direction of conveying). The first and second conveyor sections are coupled to each other, preferably for pivoting movement about a transverse axis.

It will be understood that the invention is not limited to use with side conveyors or conveyors that are part of a material processing apparatus of the type described above. For example, conveyors embodying the invention may be provided as a stand-alone machine, for example a stockpiler or auxiliary conveyor.

The invention is not limited to the embodiment(s) described herein but can be amended or modified without departing from the scope of the present invention.

We claim:

1. A conveyor comprising a first conveyor section and a second conveyor section movable with respect to said first conveyor section between a deployed state and a non-deployed state, the conveyor further comprising:
   at least one skirting movable into and out of a deployed state in which said at least one skirting extends along the second conveyor section;
   at least one skirting support coupled to said at least one skirting and movable into and out of a deployed state in which said at least one skirting support holds said at least one skirting in its deployed state; and
   actuating means for moving said at least one skirting support,
   wherein said at least one skirting is deformable or foldable,
   and wherein the, or each, skirting support is movable between said deployed state in which the skirting support holds the respective skirting in a raised position, with respect to said second conveyor section, and a non-deployed state in which the respective skirting adopts a lowered position with resect to said second conveyor section.

2. The conveyor of claim 1, wherein said at least one skirting is formed from a flexible material.

3. The conveyor of claim 1, wherein the, or each, skirting is coupled to the respective skirting support at a first coupling point, and wherein the skirting support is movable between said deployed state in which said coupling point is in a raised position with respect to said second conveyor section, and a non-deployed state in which the coupling point is in a lowered position with respect to said second conveyor section.

4. The conveyor of claim 1, wherein the, or each, skirting is coupled to the respective skirting support by a spring tensioned flexible line.

5. The conveyor of claim 4, wherein when the skirting is in its deployed state said flexible line holds said skirting in tension, and wherein when the skirting is in its non-deployed state said flexible line does not hold said skirting in tension.

6. The conveyor of claim 1, wherein the or each skirting is movable between said deployed state and a non-deployed state in which the skirting adopts a lowered position with respect to said second conveyor section in comparison with a position of said skirting in its deployed state.

7. The conveyor of claim 1, wherein the or each skirting is movable between said deployed state and a non-deployed state in which the skirting is deformed with respect to the deployed state of the skirting.

8. The conveyor of claim 1, wherein the or each skirting is coupled between the first conveyor section and said second conveyor section such that movement of the second conveyor section from its non-deployed state to its deployed state causes the skirting to adopt its deployed state, and movement of the second conveyor section from its deployed state to its non-deployed state causes the skirting to adopt a non-deployed state.

9. The conveyor of claim 1, wherein said actuating means is configured to move the or each skirting support between its deployed state and a non-deployed state.

10. The conveyor of claim 1, wherein said second conveyor section is pivotable with respect to said first conveyor section.

11. The conveyor of claim 1, wherein said first conveyor section is a base section of the conveyor, the base section optionally including a feed chute.

12. The conveyor of claim 1, wherein said actuating means comprises a linkage coupled between the skirting support and the first conveyor section, or other base structure, such that movement of the second conveyor section between its deployed and non-deployed states causes the linkage to move the skirting support between its deployed and non-deployed states, the linkage optionally being pivotably coupled to the first conveyor section, or other base structure, and to the skirting support.

13. The conveyor of claim 12, wherein the or each skirting support is pivotably coupled to the second conveyor section for pivoting movement between its deployed state and a non-deployed state, and wherein the linkage is coupled to the skirting support at a second coupling point such that the pivot axis of said skirting support is located between the second coupling point and the point at which the respective skirting is coupled to the skirting support.

14. The conveyor of claim 1, wherein said actuating means comprises resilient biasing means configured to urge the or each skirting support to adopt its deployed state, and/or wherein the actuating means comprises an actuator.

15. The conveyor of claim 1, wherein the conveyor is included in a material processing apparatus comprising a material processing unit.

16. A conveyor comprising a first conveyor section and a second conveyor section movable with respect to said first conveyor section between a deployed state and a non-deployed state, the conveyor further comprising:
  at least one skirting movable into and out of a deployed state in which said at least one skirting extends along the second conveyor section;
  at least one skirting support coupled to said at least one skirting and movable into and out of a deployed state in which said at least one skirting support holds said at least one skirting in its deployed state; and
  actuating means for moving said at least one skirting support,
  wherein said at least one skirting is deformable or foldable,
  and wherein said at least one skirting comprises a plurality of rigid or semi-rigid sections interconnected by at least one joint.

17. A conveyor comprising a first conveyor section and a second conveyor section movable with respect to said first conveyor section between a deployed state and a non-deployed state, the conveyor further comprising:
  at least one skirting movable into and out of a deployed state in which said at least one skirting extends along the second conveyor section;
  at least one skirting support coupled to said at least one skirting and movable into and out of a deployed state in which said at least one skirting support holds said at least one skirting in its deployed state; and
  actuating means for moving said at least one skirting support,
  wherein said at least one skirting is deformable or foldable,
  and wherein the, or each, skirting is coupled to the respective skirting support by a flexible line.

18. A conveyor comprising a first conveyor section and a second conveyor section movable with respect to said first conveyor section between a deployed state and a non-deployed state, the conveyor further comprising:
  at least one skirting movable into and out of a deployed state in which said at least one skirting extends along the second conveyor section;
  at least one skirting support coupled to said at least one skirting and movable into and out of a deployed state in which said at least one skirting support holds said at least one skirting in its deployed state; and
  actuating means for moving said at least one skirting support,
  wherein said at least one skirting is deformable or foldable,
  and wherein the or each skirting support is pivotably coupled to the second conveyor section for pivoting movement between its deployed state and a non-deployed state.

19. A conveyor comprising a first conveyor section and a second conveyor section movable with respect to said first conveyor section between a deployed state and a non-deployed state, the conveyor further comprising:
  at least one skirting movable into and out of a deployed state in which said at least one skirting extends along the second conveyor section;
  at least one skirting support coupled to said at least one skirting and movable into and out of a deployed state in which said at least one skirting support holds said at least one skirting in its deployed state; and
  actuating means for moving said at least one skirting support,
  wherein said at least one skirting is deformable or foldable,
  and wherein said actuating means comprises a linkage coupled between the skirting support and the first conveyor section, or other base structure, wherein the linkage comprises a flexible line, and wherein resilient biasing means are coupled between the skirting support and the second conveyor section, or other base structure, and arranged to urge the skirting support into its non-deployed state, and wherein when the second conveyor section is in its deployed state, tension in the line holds the skirting support in its deployed state against the bias of resilient biasing means, and wherein movement of the second conveyor section out of its deployed state, causes the line to be de-tensioned to allow the resilient biasing means to move the skirting support towards its non-deployed state.

20. A conveyor comprising a first conveyor section and a second conveyor section movable with respect to said first conveyor section between a deployed state and a non-deployed state, the conveyor further comprising:
- at least one skirting movable into and out of a deployed state in which said at least one skirting extends along the second conveyor section;
- at least one skirting support coupled to said at least one skirting and movable into and out of a deployed state in which said at least one skirting support holds said at least one skirting in its deployed state; and
- actuating means for moving said at least one skirting support,
- wherein said at least one skirting is deformable or foldable,
- and wherein the or each skirting support is movable from its deployed state to its non-deployed state by engagement with an abutment surface as the second conveyor section moves into its non-deployed state.

* * * * *